United States Patent
Kuno et al.

(10) Patent No.: US 7,822,675 B1
(45) Date of Patent: Oct. 26, 2010

(54) GENERATION OF COST OR PRICE QUOTATIONS

(75) Inventors: Harumi Anne Kuno, Palo Alto, CA (US); Kevin Lee Smathers, Palo Alto, CA (US); Troy Shahoumian, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 645 days.

(21) Appl. No.: 11/552,510

(22) Filed: Oct. 24, 2006

(51) Int. Cl.
*G06Q 40/00* (2006.01)

(52) U.S. Cl. ....... 705/37
(58) Field of Classification Search .......... 705/37
See application file for complete search history.

(56) References Cited

U.S. PATENT DOCUMENTS

| | | | |
|---|---|---|---|
| 2002/0007324 A1 * | 1/2002 | Centner et al. | 705/26 |
| 2002/0035536 A1 * | 3/2002 | Gellman | 705/37 |
| 2002/0147655 A1 * | 10/2002 | Say | 705/26 |
| 2002/0147675 A1 * | 10/2002 | Das et al. | 705/37 |
| 2004/0083160 A1 * | 4/2004 | Byde et al. | 705/37 |
| 2004/0133498 A1 * | 7/2004 | Yeh et al. | 705/37 |
| 2004/0193533 A1 * | 9/2004 | Chang et al. | 705/37 |
| 2007/0050280 A1 * | 3/2007 | Madle et al. | 705/37 |
| 2007/0143202 A1 * | 6/2007 | Spangler | 705/37 |

FOREIGN PATENT DOCUMENTS

| | | |
|---|---|---|
| WO | WO 00/52605 | 9/2000 |
| WO | WO 01/63525 | 8/2001 |
| WO | WO 01/77781 | 10/2001 |

OTHER PUBLICATIONS

David Porter, Stephen Rassenti, Anil Roopnarine, and Vernon Smith; "Combinatorial auction design", Jun. 17, 2003, Proceedings of the National Academy of Sciences.

Wes Guillemaud, Ted Farris, Dan Hooper, "Lowering Total Cost Through Reverse-Auctions", 90th Annual International Supply Management Conference, May 2005.

"Electronic Multi-Attribute Reverse Auction (eMARA)"; printout from http://www.cmis.csiro.au/OR/pdf/other/emara_brief_description.pdf—20k—[pdf ]—Cached—Apr. 16, 2003.

* cited by examiner

*Primary Examiner*—Jagdish N Patel
*Assistant Examiner*—Kevin Poe

(57) ABSTRACT

Provided are systems, methods and techniques for, among other things, generating a master price quotation. In one representative embodiment, a representative creates a list that includes at least one item to be included within a master price quotation and submits the list to an automated bidding agent. In response, the automated bidding agent communicates requests for quotations to different automated entity agents, each such automated entity agent corresponding to a different entity. The automated bidding agent then receives the quotations from the automated entity agents, selects a best quotation, and communicates the best quotation to the representative for inclusion within the master price quotation.

19 Claims, 4 Drawing Sheets

GENERATION OF COST OR PRICE QUOTATIONS

FIELD OF THE INVENTION

The present invention pertains to systems, methods and techniques for use by a company or other organization when generating cost estimations for a master price quotation.

BACKGROUND

In the course of conducting business, a company often specifically is requested to provide price quotations with respect to particular products and/or services that have been identified by a customer or potential customer. In other cases, the customer or potential customer merely identifies its needs in a general manner (without reference to specific items of hardware, software or services) and requests a proposed solution and a price quotation for implementing the solution. In still other cases, the customer or potential customer makes a request that includes a mixture of both specifically identified items and a solution to generally identified needs. Such a request may be made to a single vendor or simultaneously to multiple vendors.

Responding to such a request often is difficult, particularly for very large companies having many geographically dispersed divisions and sites. For example, estimating the internal cost of components of the response often is challenging because the divisions and sites may not share a common cost structure, and their own internal costs may fluctuate frequently depending on external factors such as exchange rates, market conditions, and availability of resources. A number of different approaches have been taken with respect to this problem.

According to one approach, the company utilizes a global internal costing model. An advantage of this approach is that it usually is fairly fast at generating a quotation (or estimate) and then subsequently revising the estimate in the event that the customer's requirements change. Unfortunately, it often is extremely difficult to create and maintain a global internal costing model that accurately reflects the company's lowest global cost of delivering each potential product or service, while accounting for all possible variations. As a result, such a model often suffers from inaccuracy, high costs to maintain, or a combination of these problems.

Another approach is to make inquiries to each of the divisions or sites that are possible sources for each of the products or services that are to be included in each new customer pricing quotation. However, this too typically is very expensive and, potentially even worse, extremely time-consuming. Accordingly, employing this approach often results in significant delays, both in producing the initial quotation and then subsequently revising it in the event the customer's requirements change. In addition, coordinating all of the necessary people for each quotation and subsequent revision typically is highly cumbersome, at the very least. After multiple revision requests, it is not uncommon for at least some of the people involved to lose interest and become non-responsive, thus further impairing the company's ability to quickly respond to customers' requests.

DESCRIPTION OF THE PREFERRED EMBODIMENT(S)

As indicated above, the present invention concerns various systems, methods and techniques for generating competitive customer pricing quotations in a timely and efficient manner. In addition to the problems mentioned above, the present inventors have discovered that in certain cases, due to the specific interests of individual people or entities within a company, situations occur in which prices sometimes are bid below rates that are commercially competitive, thus unnecessarily eroding the company's profit margins.

In this regard, the primary motivation for an individual attempting to present a quotation on behalf of the company (the "deal architect") often will be to ensure that the deal is consummated. To achieve this result, the deal architect sometimes will use sharp negotiation tactics to reduce the costs (or prices) originally quoted by various entities (e.g., divisions or sites) within the organization. For example, the deal architect might tell one entity that another entity within the organization is able to provide a product at a particular cost (or price), without also disclosing that such costs (or prices) in fact are artificially low because the other entity cannot meet some non-negotiable constraint of the customer (such as a certain level of quality) or because such costs (or prices) do not take into a particular requirement (such as shipping charges required to deliver the products to a required destination); as a result, the first entity sometimes will unnecessarily reduce its quotation to "match" that of the second entity.

Figure 1:
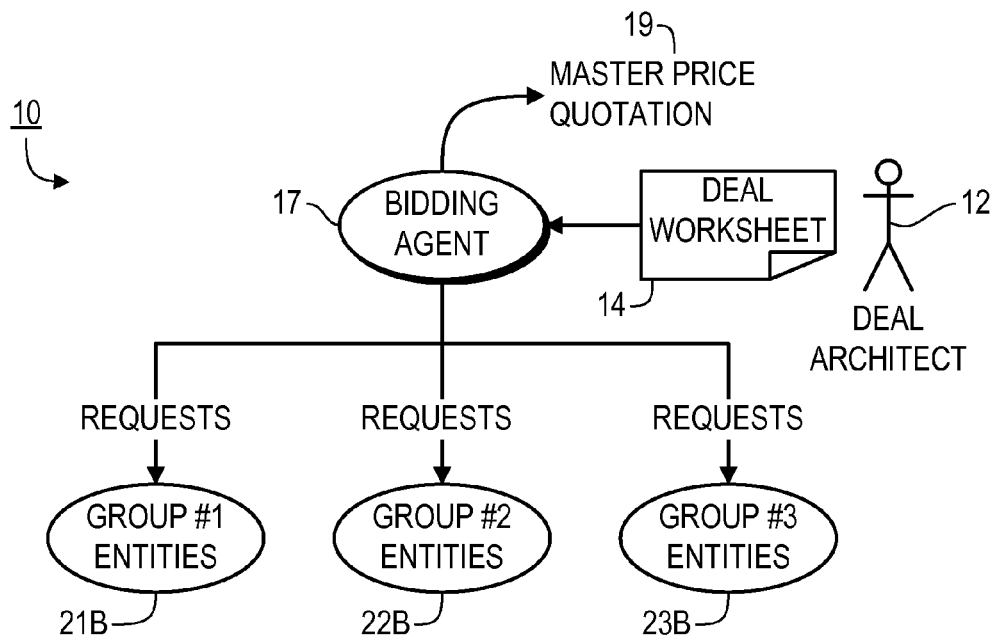
FIG. 1 is a block diagram illustrating an overview of a system for generating a master price quotation according to a representative embodiment of the present invention.

This problem, as well as others pertaining to the generation of a master price quotation by a company, is addressed by the present invention. FIG. 1 is a block diagram illustrating an overview of a system 10 for generating a master price quotation according to a representative embodiment of the present invention. In this embodiment, the deal architect 12 has primary contact with the customer or potential customer (not shown). Although generally shown and described as a single person, in certain embodiments the deal architect 12 is comprised of a team of people representing the company on whose behalf the price quotation is being generated. In any event, the deal architect 12, through communications with the customer, becomes aware of the customer's needs and then designs a bundle of products and services that can accommodate those needs.

The end result of this design process is a deal worksheet 14 that lists all of such items, together with the requirements pertaining to each. The deal worksheet 14 is described in more detail below. However, it generally is preferred that the deal worksheet 14 is a highly structured document that is largely capable of being interpreted and parsed by an automated (e.g., software) agent, such as bidding agent 17.

Upon receipt of the deal worksheet 14, bidding agent 17 is responsible for obtaining quotations for the individual items listed in the deal worksheet 14 and, in the preferred embodiments, assembling at least a preliminary draft of a price quotation 19. As discussed in more detail below, automated bidding agent 17 accomplishes this by communicating with various entities (e.g., entities 21-23) within the company.

Figure 2:
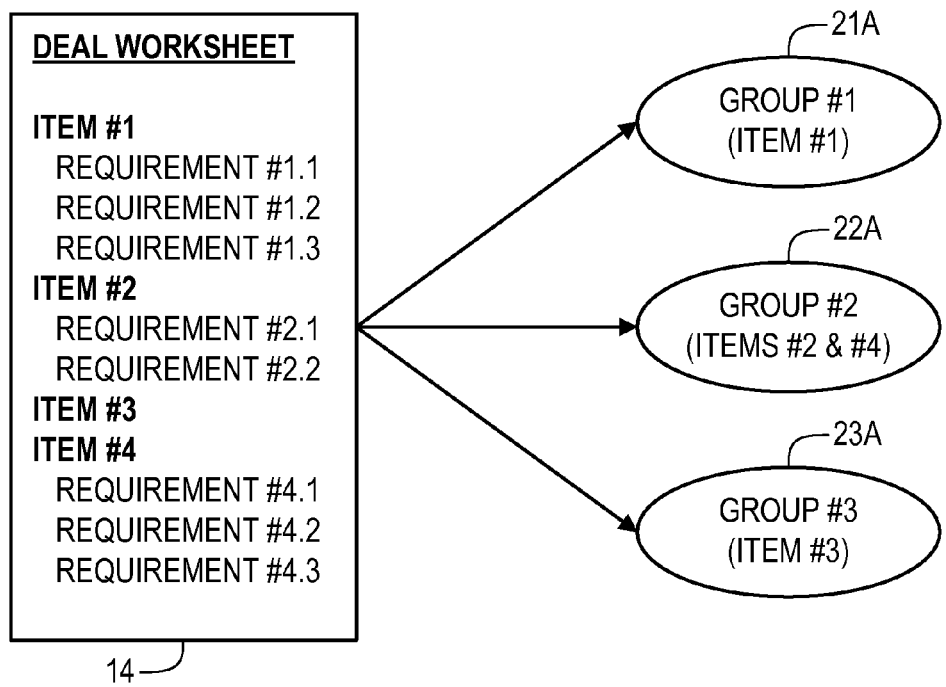
FIG. 2 illustrates one example of how a list of items and corresponding requirements is separated out into groups according to a representative embodiment of the present invention.

As indicated above, the bidding agent 17 preferably separates out the individual items in the deal worksheet 14, identifies one or more entities that are capable of providing each item, and then, with respect to each item, requests quotations from the entities that are capable of providing such item. The first step of this process is illustrated in FIG. 2. As shown, deal worksheet 14 includes various items (e.g., items #1-4), which can be products (e.g., specific items of hardware) or services (e.g., support or installation services). Each such item can include zero or more requirements (e.g., with respect to item #1, requirements #1.1-#1.4), which might include a required delivery date, a particular product configuration, particular days and hours of required support service, and the like. The individual items (e.g., items #1-4) in deal worksheet 14 preferably are divided up into groups (e.g., groups and 21A-23A), as discussed in more detail below, with the group preferably containing one or more items (or, as noted below, sub-items), which groups are then separately bid out.

Thus, for example, element 21B in FIG. 1 represents all of the entities that will receive requests to provide a quotation with respect to group 21A, element 22B represents all of the entities that will receive requests to provide a quotation with respect to group 22A, and element 23B represents all of the entities that will receive requests to provide a quotation with respect to group 23A. As discussed in more detail below, the bidding agent 17 identifies the best bids for each group and then communicates such bids to the deal architect 12, e.g., in the form of a preliminary draft of a master price quotation 19.

Figure 3:
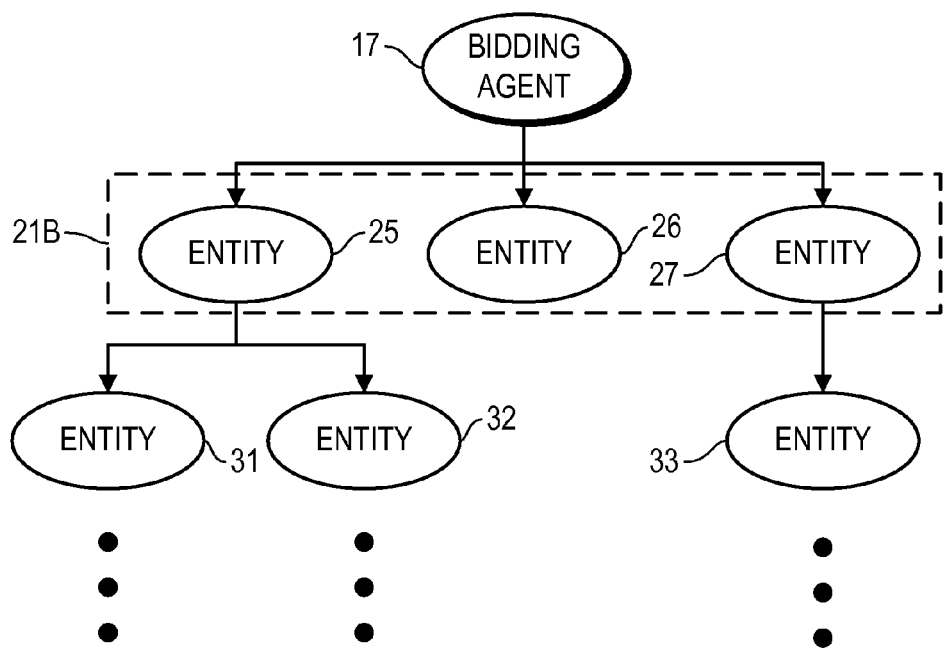
FIG. 3 is a block diagram showing the hierarchical structure of an exemplary quotation request, according to a representative embodiment of the present invention.

The techniques of the present invention can be invoked recursively. For example, referring to FIG. 3, the individual entities 21B that are requested to provide quotations with respect to group 21A, i.e., entities 25-27, preferably also have the ability to invoke the bidding agent 17 and request quotations from other entities within the organization (e.g., entities 31-33) in order to obtain some portion of the item for which they are providing a quotation. Similarly, those entities also preferably have the ability to invoke the bidding agent 17 to obtain sub-portions of their respective portion, and so on.

It is noted that the various entities within the organization generally can be organized geographically, functionally or in any other manner. For the present purposes, however, such organizational structures typically are irrelevant; instead, it usually is only desirable to know whether the entity can provide some item or portion of it, according to the specified requirements and, if so, what the total price such entity would charge for doing so.

Figure 4:
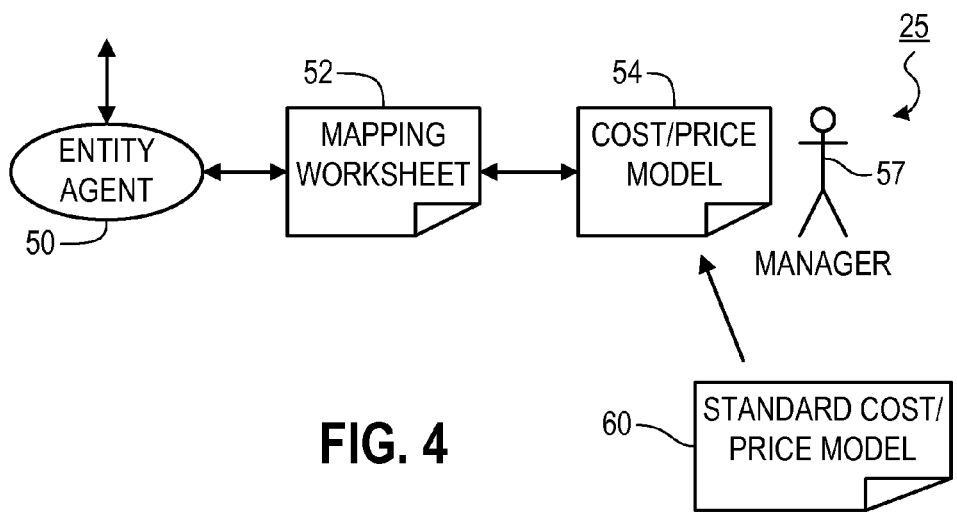
FIG. 4 illustrates certain portions of an entity within an organization, according to a representative embodiment of the present invention.

FIG. 4 illustrates certain portions of an exemplary one of the entities, entity 25. However, each entity within the organization (e.g., each of entities 26, 27 and 31-33) preferably has a structure that is similar or identical to that of entity 25.

Referring to FIG. 4, entity 25 is represented in the bidding process by an automated (e.g., software) entity agent 50, which interacts directly with the bidding agent 17. The main software/data resource utilized by entity agent 50 is cost/price model 54, which preferably is implemented as an Excel™ spreadsheet. More specifically, entity agent 50 preferably accesses the cost/price model 54 through a mapping worksheet 52 which maps parameter (or cell) names used by the entity's cost/price model 54 with the standard list of parameters used by bidding agent 17. Often, as discussed in more detail below, in the preferred embodiments of the invention, cost/price model 54 will be a deal-specific version of a general cost/price model 60 used by the entity 25.

In the preferred embodiments, each entity has complete or nearly complete control over its cost/price model 54, and decides what interfaces (e.g., specific spreadsheet input and output cells) will be exposed to the rest of the organization. More preferably, only a single price quotation is output in response to a number of input parameters or requirements. In any event, the cost/price model 54 preferably is a relatively detailed model, providing pricing quotations based on a plurality of exposed input variables, such as a minimum of 5, 10, 20 or even 30 such exposed input variables. Because very little information is output and access to the cost/price model 54 is tightly controlled in the preferred embodiments of the invention, the individual entities are able to protect their proprietary pricing strategies while making them available for quickly and efficiently generating price quotations for individual items that collectively can be assembled into a master price quotation for large and complex combinations of products and services.

As discussed in more detail below, responses provided by the entity agent 50 can be either fully automated, partially automated or entirely manual, preferably as decided in the sole discretion of the individual entity 25 itself. For the manual portions of any particular response, one or more representatives of the entity 25 typically provide input. Such representatives collectively are represented in FIG. 4 as manager 57.

Figure 5:
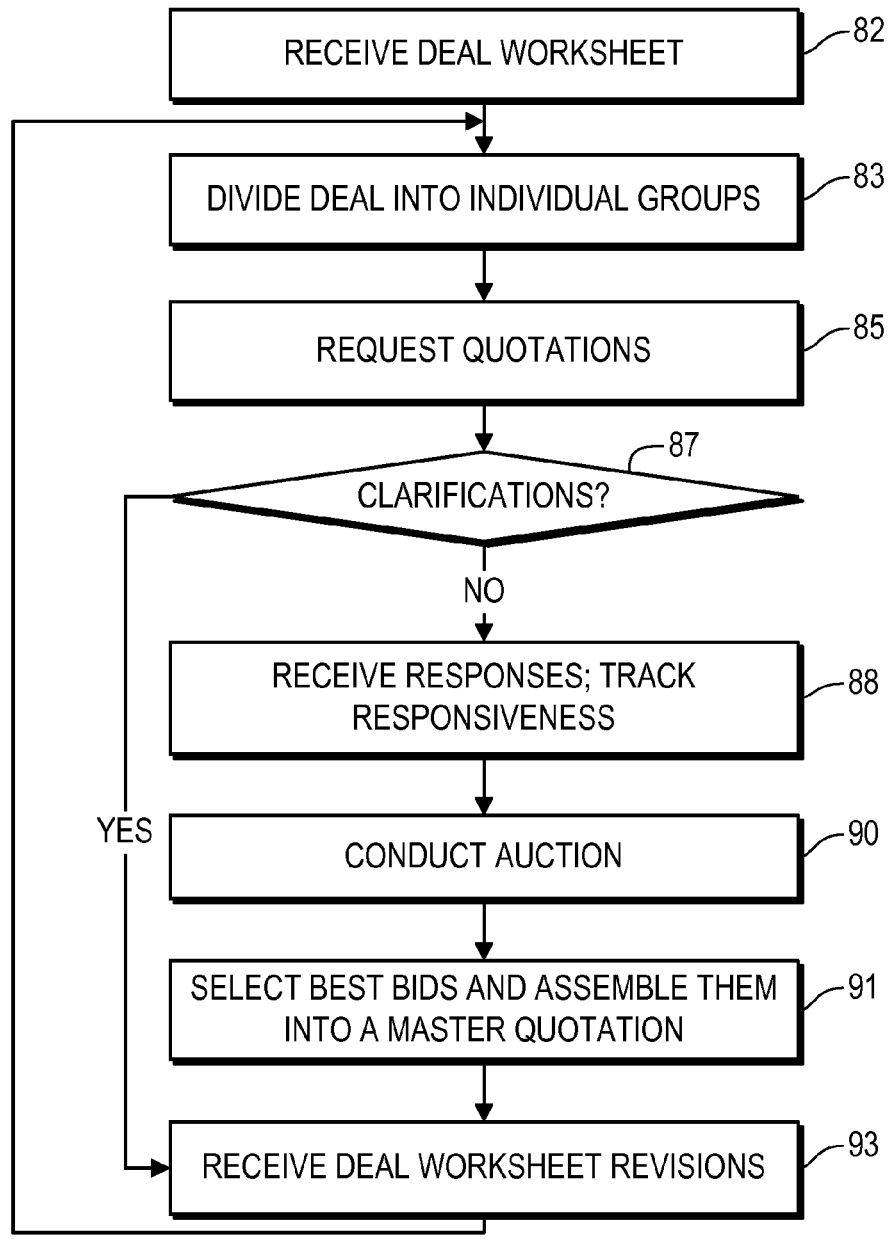
FIG. 5 illustrates a flow diagram for explaining processing by a bidding agent according to a representative embodiment of the present invention.

FIG. 5 illustrates a flow diagram for explaining processing by bidding agent 17 according to a present embodiment of the invention. Because bidding agent 17 plays a central role in the overall process in this embodiment, FIG. 5 also reflects such overall process, albeit from the perspective of bidding agent 17.

Initially, in step 82 bidding agent 17 receives the deal worksheet 14 from the deal architect 12. In the present embodiment, the deal worksheet 14 consists of in particular a single physical user interface, e.g., an Excel™ spreadsheet. More generally, however, deal worksheet 14 can be considered to be the input user interface between the deal architect 12 and the bidding agent 17, allowing the deal architect 12 to specify any and all information relevant to the particular deal. Accordingly, the deal worksheet 14 primarily is a functional designation and, depending upon the particular embodiment, can be comprised of multiple different component user interfaces.

In the preferred embodiments of the invention, deal worksheet 14 is entirely, almost entirely or at least substantially a structured document, composed from a set of standard items, fields, and requirement codes. For example, a record indicating the order of a number of personal computers (PCs), which can be considered to be a single item, can be structured as: {item identification; model; CPU; memory; hard disk; drives; software; monitor; peripheral devices; shipping destination; due date; quantity}, where the initial field identifies the type of item (in this case a PC) and the subsequent fields vary depending upon that identification. Here, the subsequent fields refer respectively to: the model of each PC in the order, the type of CPU to be included, the amount of RAM, the type of hard disk drive and amount of storage, a list of other drives (e.g., CD-RW, DVD) to be installed, the types of software to be installed, the type and size of monitor, a list of additional peripheral devices to be included (e.g., type of mouse and keyboard, and any printers, scanners or digital cameras), the shipping destination, the date (if any) by which delivery is required (which can be specified by the customer or, in the event that delivery is part of a larger system which must be completed by a particular date, can be specified by the deal architect 14 as necessary to satisfy the project schedule), and the number of PCs to be delivered.

The deal worksheet 14 can include any number of different items, including products and/or services, which together typically will comprise a single overall project. The structure to which the deal worksheet 14 conforms preferably is published to all entities with which the automated bidding agent 17 interacts (or at least the respective portions of such structure that are applicable to each entity).

Although such a predefined structure preferably addresses most of the variations that customers typically will need, it generally is impossible to cover each potential variation. Accordingly, each item preferably includes at least one field for unstructured comments and/or requirements. While the structured elements of the deal worksheet 14 typically will be capable of being read and interpreted by an automated process (e.g., the various entity agents 50), the unstructured information typically will require human interpretation. However, in most cases the individual items themselves can be identified in a structured manner (e.g., using a unique predefined code), although one or more of the specifications or requirements pertaining to the item might need to be specified in an unstructured manner, because the predefined formatting structure does not accommodate a particular specification or requirement.

In the current embodiment, the deal worksheet 14 is required to be created using the same standard formatting structure that is used by the bidding agent 17. In alternate embodiments, individual deal architects 12 utilize their own naming conventions or formatting styles. In such a case, provided that all the same content is included, the bidding agent 17 (e.g., before doing anything else) transforms such formatting into its own standard formatting structure using a defined mapping worksheet (e.g., similar to mapping worksheet 52 referenced above).

Once the information has been received in the standard formatting structure, in step 83 bidding agent 17 divides the required items into groups for the purpose of separately bidding each group. In this regard, the deal worksheet 14 itself can include either explicit instructions or guidance from the deal architect 12 regarding how the individual items are to be grouped together for bidding purposes. For example, the deal architect 12 might, for reasons of ensuring single-entity accountability, want a particular product to be bundled together with certain support services for that product. Alternatively, each item in the deal worksheet 14 simply can be treated as its own separate group. Otherwise, the bidding agent 17 preferably divides the listed items based on pre-specified rules. Those rules preferably group items based on relatedness and based on the likelihood that individual entities will be able to provide all the items in the group, either directly or through access to subcontractors. In the absence of any applicable rule, the bidding agent 17 preferably assumes that each item is to be bid separately, i.e., as its own group.

Also, in certain embodiments of the invention rules are specified such that bidding agent 17 divides a single item specified by deal architect 12 into multiple sub-items which are bid out separately or in combination with other listed items. For example, required 24-hour support service might be divided out into three 8-hour coverage periods that are bid out separately (typically, with the expectation that sites in different time zones will be more competitive with respect to different time periods). Accordingly, unless clearly specified otherwise, the concept of grouping items, as used herein, should be understood to encompass combining items together, subdividing items or both.

Next, in step 85, for each group, the bidding agent 17 identifies the particular entities within the company that are capable of providing the items within such group. Then, the items within that group, together with their specifications and requirements, are separately packaged and sent to such entities, along with a request for such entities to provide a price quotation to deliver the items within the group, according to the identified specifications and requirements.

Once again, the deal worksheet 14 preferably can include information regarding which entities should be queried with respect to each identified group. However, unless there are particular issues that indicate otherwise (e.g., significant quality control issues pertaining to certain entities), each entity that is capable of providing the items within a group preferably is given the opportunity to bid on providing such items. Alternatively, the standard can be relaxed somewhat, e.g., allowing entities that are capable of providing some minimally specified percentage of such items (e.g., 90%) an opportunity to provide a quotation. Such an alternative recognizes that any entities that are not fully capable of providing all of the items listed within a group might still want to submit a quotation on the basis that they can obtain the missing items from other entities (e.g., in the recursive manner mentioned above).

As a still further alternative, in certain embodiments all entities have the opportunity to submit a quotation on any group that is bid out. One advantage of this alternative is that all of the entities within the company can become aware of the types of deals that are coming through and the corresponding items that are in demand, thereby suggesting to them that they might begin providing a particular product or service if it is possible to do so in a cost-competitive manner.

However, most embodiments will involve some selection of entities for narrowing down who gets to bid on what groups. For this purpose, a voluntary registration program preferably is used, allowing each entity to specify what products and services it is capable of providing. More specifically, the same formatting structure that is used to define the deal worksheet 14 (or at least the standard formatting structure used by bidding agent 17) preferably is used as a registration template, allowing each entity within the company to identify the parameters under which it is capable of satisfying a particular item. For instance, in the PC example given above, a given entity might submit a registration form including one line for the item type of "PC", listing the particular models that it produces in the second field, and designating "any" for all of the remaining fields. Another line might be included for the item type "telephone support", indicating the hours of availability (e.g., in Greenwich Mean Time), the technical categories for which support can be provided, and the languages in which support can be provided.

Assuming similar registration forms have been submitted by each entity within the organization, it is typically a straightforward matter for the bidding agent 17 to identify all of the entities that can satisfy all (or if some specified percentage) of the specifications and requirements for each item in a particular group. Upon making such an identification, the requests for quotation preferably are automatically distributed to such entities (more preferably, to each entity's automated entity agent 50) in electronic format.

In step 87, a determination is made as to whether any of the bidding entities have requested clarification with respect to any of the requirements. Typically, such clarifications would be requested where a missing piece of information might significantly affect the cost of delivering the corresponding item. If any such request(s) for clarification have been received, such request(s) preferably are forwarded directly to the deal architect 12, and then processing proceeds to step 93 to await the revised deal worksheet 14. In this regard, any revisions to the deal worksheet 14 preferably are forwarded to each entity that has been asked to bid on the group to which such revisions pertain, so that all bidding entities have the same information available to them.

Otherwise, processing proceeds to step 88, in which responses are received from the various entities for each group of items. One advantage of using an automated system, as in the present embodiment of the invention, is that it provides the company an ability to easily keep accurate computer records regarding how responsive various entities are at providing quotations. Because requests for quotations typically will be generated on a fairly regular basis, there ordinarily will be a sufficient quantity of data to provide reliable indications of how responsive each entity is, and such information preferably is used in evaluating the performance of each entity. It is noted that with conventional manual systems for querying individual entities within an organization, there often is no or very limited record-keeping in this regard and no central repository for any information that is generated.

Accordingly, in this step 88 the bidding agent 17 keeps track of when the requests were transmitted and when the responses were received. In the preferred embodiments, monthly or quarterly reports (including either the raw data or statistical summaries) are generated with respect to each entity and provided to upper-level management within the organization, for use in evaluating the entities.

As discussed in more detail below, the present invention also provides a number of automated tools and predefined structures that allow the various entities to provide quotations quickly. As a result, the standards for responsiveness can be set higher than would be possible in connection with conventional techniques.

In step 90, after responses have been received, bidding agent 17 optionally conducts an auction in an attempt to reduce the quoted price for the subject group of items even further. In the preferred embodiments, such an auction is conducted as a reverse auction, in which the various entities observe the prices bid by competing entities and incrementally reduce their prices until the lowest price is achieved. Because each entity preferably is bidding against the exact same requirements, none typically will be deceived into believing that another can provide the item or group of items at an artificially low price. As a result, a lowest competitive, but not unnecessarily low, price often can be achieved. At the same time, the individual entities often will obtain other information regarding relative competitive advantages of other entities within the company, and such information can be used to inform each entity's production and planning strategies.

In step 91, the bidding agent 17 identifies the best bid for each group of items and then, in the preferred embodiments, assembles those bids into at least a preliminary master price quotation. It is noted that the best bid generally will be, but need not necessarily be, the lowest bid. Ordinarily, all entities within the company are held to minimum quality and reliability standards so that the submitted bids can be compared without adjustment. However, in certain embodiments of the invention, adjustments are made based on historical quality or reliability differences, or any other relevant factors.

For example, in one representative embodiment the deal architect 12 (e.g., through the deal worksheet 14) or some other person or entity within the company (e.g., based on embedded periodically updated quality factors) has the ability to specify adjustment factors for any or all of the various entities that will be submitting bids. In the preferred embodiments, either: (i) all such adjustment factors are visible to all participants in the bidding process; or (ii) only an individual entity's adjustment factor is visible to it, but the adjusted bids are visible to all participants, so that in either case each bidding entity is aware of the benchmark against which it is bidding.

Once all such "best" bids have been identified, it generally is straightforward to assemble them into a preliminary master price quotation. Preferably, the individual items that were originally specified by the deal architect 12 are listed in a prescribed (e.g., a company-specified) quotation format, with the "winning" bids inserted. Ordinarily, if adjustment factors were used (as described above), then the non-adjusted bids would be inserted, with any excess preferably allocated to a project reserve fund that can be used to fix any deficient deliveries. Upon completion of this preliminary master price quotation, the deal architect 12 preferably has the option to make formatting revisions and/or add relevant notations.

Because the foregoing process is largely automated and the determination of the best competitive prices preferably is made in an unbiased manner and without pressure or even involvement from the deal architect 12, many of the pressures to produce unnecessary low quotations often will be avoided. In certain embodiments of the invention, the deal architect 12 is not even informed as to who the individual bidders are. That is, the deal architect 12 preferably is at most notified only about the identity of the winning bidder for each item or group of items. Such precautions often can have the effect of further reducing any possibility that the deal architect 12 will attempt to directly approach individual entities to extract a lower quotation price.

Finally, after the master price quotation has been generated, and often after it has been delivered, the customer will make changes to its requirements. Sometimes such changes are prompted by quotations and/or other feedback that it has received in connection with the request(s) for quotations that it has issued, both to the company implementing system 10 and to any other companies. If such changes are requested, then the deal architect 12 typically will generate a revised deal worksheet 14, which is received by the bidding agent 17 in step 93. Thereafter, the foregoing process preferably is repeated, beginning with step 83. It is noted that revised deal worksheets may be received under other circumstances, as well, such as noted above in connection with the description of step 87.

It also should be noted that the arrangement of the steps described above is merely exemplary. In actual implementation, the order of such steps often will vary. For example, either of steps 87 or 93 generally can occur at any of a variety of different points during the process.

Figure 6:
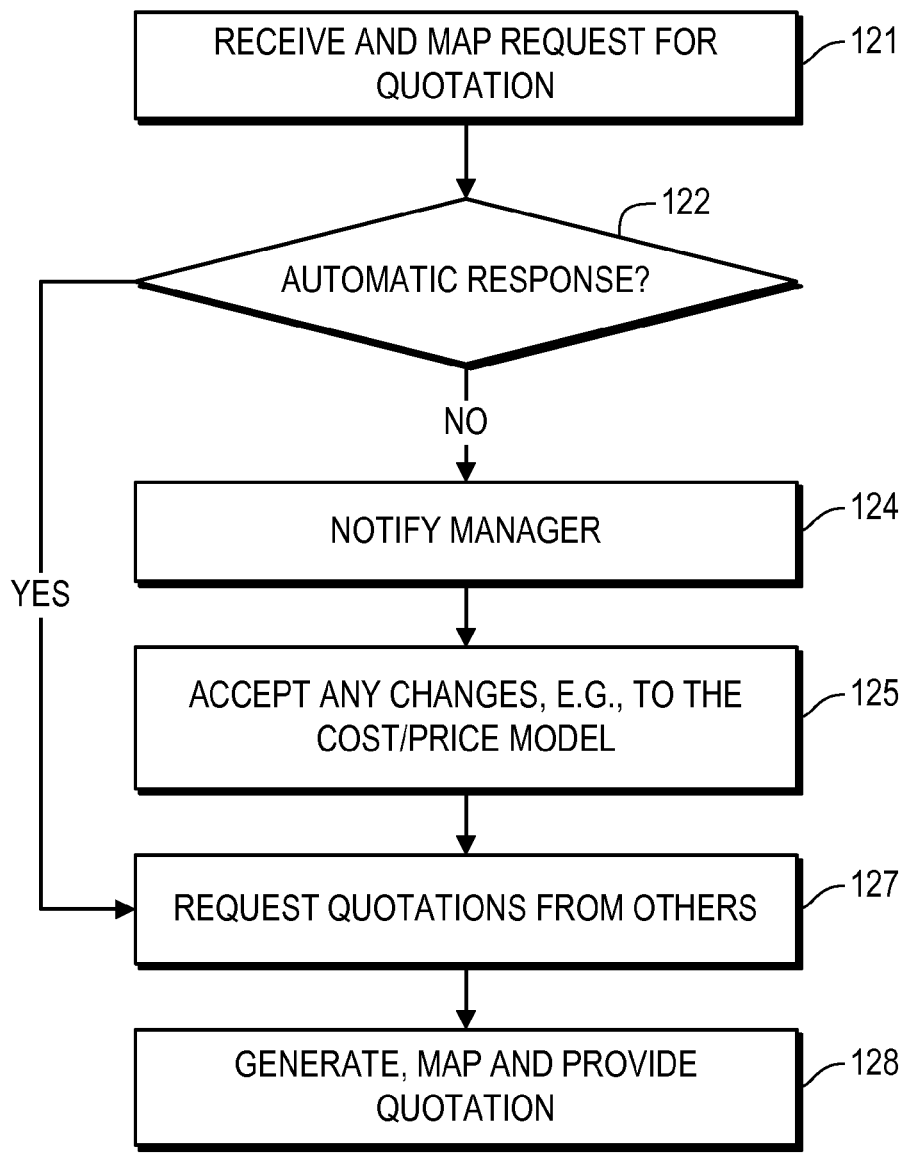
FIG. 6 is a flow diagram illustrating a process performed by an entity agent according to a representative embodiment of the present invention.

FIG. 6 is a flow diagram illustrating a process by which an entity agent 50 provides a quotation according to a representative embodiment of the present invention. Initially, in step 121 a request for quotation is received from the bidding agent 17. Upon receipt, the structured elements within the request preferably automatically are transformed using mapping worksheet 52 from the standard format used by bidding agent 17 to the format used by the cost/price model 54.

Next, in step 122 entity agent 50 determines whether a response to the request can be generated automatically. In this regard, the manager 57 preferably has the ability to configure the entity agent 50 to trigger an automatic response if specified conditions are satisfied. For example, manager 57 might configure entity agent 52 to automatically respond to any request where all of the variables are within ranges that can be accommodated by the cost/price model 54 (either with or without notice to the manager 57). Alternatively, manager 57 might configure entity agent 52 to only automatically respond to such requests if they are within a narrower range of parameters than are technically capable of being accommodated by the entity 50, e.g., if the required quantities are below certain specified thresholds, and to bring to the attention of the manager 57 any larger transactions. Still further, the manager 57 might configure entity agent 50 to automatically respond in certain cases after a specified period of time if the manager 57 has not manually stopped the submission.

In the preferred embodiments, any request for quotation that includes unstructured elements (e.g., requests having any data in a field reserved for unstructured comments, notations, specifications or requirements) automatically is brought to the attention of the manager 57, and a quotation is not submitted until the manager 57 has approved it.

If an automatic response is to be generated without input from the manager 57, e.g., according to any of the conditions noted above, then processing proceeds to step 127. Otherwise, the manager is notified in step 124, preferably using an electronic notification such as e-mail or by automatically inserting a corresponding task into the task list for manager 57, and the submission is delayed until the manager 57 approves it.

In any event where the manager 57 is notified, the entity agent 50 preferably provides at least a preliminary quotation for the manager 57 to review, e.g., based on its processing of the structured elements of the request, and highlights any unstructured elements or any other elements which should be carefully considered by the manager 57.

In step 125, any changes, e.g., as specified by manager 57, are accepted. For example, the manager 57 might make changes to the preliminary quotation generated by the entity agent 50 or to the cost/price model 54, in order to account for the unstructured notations, comments, specifications or requirements, or to account for structured elements that are not currently accommodated by the existing cost/price model 54. In this regard, it is preferred that the manager 57 make any such changes that are desirable to reflect deal-specific parameters directly to the cost/price model 54, so that any future revisions to the request can be handled automatically, or at least substantially automatically.

In doing so, the manager 57 preferably makes a deal-specific version 54 of the entity's standard cost/price model 60. Preferably, that deal-specific model 54 (which may be further revised in connection with subsequent revisions to the deal worksheet 14) is used with respect to all requests for quotation arising out of future revisions of the deal worksheet 14 for this particular deal.

For example, if the present request for quotation includes as one of its elements support services with respect to a particular software package with which the entity has very little previous experience, then the manager 57 preferably modifies the cost/price model 54 to include fixed ramp-up charges to acquire such expertise as well as variable charges to account for the number of support personnel who will need to be trained with respect to that technology based upon the required support demands.

Depending upon how likely it is that the particular requirement or modification to the standard cost/price model 54 is likely to be encountered again, the corresponding modification also can be incorporated into the general cost/price model 60 utilized by the entity 25. However, simply modifying the project-specific cost/price model 54 in order to accommodate special requirements ordinarily will be easier than modifying the general cost/price model 60 to accommodate such special requirements. This is because modifying the project-specific cost/price model 54 typically only requires evaluation of the impact of such special requirements within the range of scenarios that are contemplated in connection with the current project. On the other hand, modifying the general cost/price model 60 typically would require evaluating such impact with respect to every potential scenario that is accommodated by the general cost/price model 60. In other words, the use of a project-specific cost/price model 54 permits consideration of special requirements but only within a relatively narrow range of parameter values.

In the specific example given above, it ordinarily will be relatively easy to adjust a project-specific model 54 to account for training of new people with respect to some particular piece of software, provided that certain assumptions exist (e.g., English-language support, hours of support between 9:00 a.m. and 5:00 p.m. Pacific Standard Time). On the other hand, modifying the general model 60 to accommodate support for that particular piece of software where the model must be general not to accommodate any specified hours of support and any of the languages ordinarily supported by the particular entity 50.

In addition to any modifications to the cost/price model 54, the manager 57 preferably also modifies the automatic-response criteria, defining additional conditions regarding when future request revisions can be handled on a fully automatic basis, when they can be handled automatically if the manager 57 has been notified and has not responded within a specified period of time, and when no response should be submitted until the manager 57 has first approved it. As a result, it often will be more likely that an automatic (and therefore faster) response can be generated in the event that a change to the requirements occurs (e.g., resulting from a revision to the deal worksheet 14).

When determining whether to modify the cost/price model 54 to accommodate a change or to manually make an adjustment to the preliminary quotation generated by entity agent 50, the manager 57 preferably takes into account the particular requirements that have been designated as potentially subject to change in the request for quotation. Any such requirements preferably are accommodated by modifying the model 54 so that if changes do in fact occur in the future, the model 54 is able to accommodate them without future manual input from manager 57.

In step 127, the entity agent 50 optionally submits requests for quotations to other entities with respect to any portions of the requirements that it cannot, or cannot cost-effectively, handle internally. In the preferred embodiments, such requests are triggered (together with identification of the specific entities that perform such work) and then generated and transmitted to the bidding agent 17 automatically as a result of encountering a corresponding "subcontract" flag within the cost/price model 54. Such a flag preferably arises whenever the cost/price model encounters requirements that cannot be satisfied internally by entity 50 or that presumably can be satisfied more cost-effectively by another entity. Such requests preferably also can be generated manually, e.g., by the manager 57. In any event, when such subcontracting quotations are desired, the preferred technique is for the current entity 25 simply to invoke the bidding agent in a similar manner to the process described above in connection with FIG. 5.

Finally, in step 128 the quotation is generated based on the cost/price model 54, any additional input received from manager 57, together with the best quotations received from any subcontracting entities, if any. Then, any format transformation is performed, e.g., using mapping worksheet 52, and the quotation is transmitted to bidding agent 17.

The foregoing discussion concerns an entity's typical submission of a quotation. As noted above in connection with step 90 (shown in FIG. 5), in certain cases the bidding agent 17 will conduct an auction. When such auctions occur, the individual managers 57 preferably will be notified and at least some will participate personally, reducing their prices to the extent that they believe (within their best judgment) that the deliverables can be provided with an acceptable profit margin. Other managers 57 set up automated agents (e.g., their respective entity agents 50) to implement their bidding strategies, e.g., by setting a lowest bid price, rules for how far to bid below another competing bid, and rules for how long to wait before submitting such a bid. In either case, the managers 57 sometimes will be induced to bid below their ordinary prices (as determined by the cost/price model 54) based on immediate circumstances, such as a temporary excess in production or manpower capacity or in inventory, or a short-term desire to boost revenues. However, such lower-then-normal bids will tend to be economically efficient (by making maximum economic use of otherwise unutilized or under-utilized assets), as opposed to the economically inefficient bids that often are produced with conventional intra-company bargaining techniques.

In the discussions above, the present techniques are applied with respect to the generation of a master price quotation generated entirely by a single company, with all of the deliverables to be provided by different entities within that company. As indicated, such techniques often can result in significant efficiencies by producing competitive, but not unduly low, prices and by taking advantage of local efficiencies and excess capacities. In addition, the present invention often can enable better monitoring of entity responsiveness.

The automated techniques of the present invention also can be used by the implementing company to generate current information regarding the relative efficiencies and costs of its various entities. For example, the submitted quotation amounts can be collected and analyzed to derive information which, when combined with other metrics regarding the entities, can provide useful insights regarding entity performance and management and quality. For example, if a particular entity is known to be under-utilized and is not lowering its prices to a level just above its variable costs, further inquiries may be necessary to understand management's rationale. Also, if an entity is submitting quotations that are lower than would be expected given in its labor and capital costs (even if such quotations are not the lowest submitted), further investigation might reveal efficiencies that can be applied in other entities within the company.

Also, the techniques of the present invention also can be applied where outside vendors are being used to subcontract some or all of the deliverables that are intended to be provided to the ultimate customer. In such a case, such outside vendors preferably have a sufficiently close relationship with the company that is implementing bidding agent 17 that such outside vendors are included within the system and advised of the formatting structures used by bidding agent 17. As a result, such outside vendors preferably are able to submit quotations and bid competitively in the same manner as any entity within the organization of the implementing company.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

The discussion above refers to a master price quotation. As indicated above, in certain embodiments of the invention the master price quotation is a customer price quotation in which the submitting organization is bidding to provide products or services to a potential customer. However, in alternate embodiments the master price quotation is a "supplier price bid quotation" in which the submitting organization is competing for vender supplies (e.g. memory boards or other scarce components), and the individual entities within the submitting organization are providing the representative with a "highest price" that they are willing to pay for the scarce good.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method for generating a master price quotation, comprising:
    (a) a representative (i) creating a list comprising a plurality of items to be included within a master price quotation and (ii) submitting the list to an automated bidding agent;
    (b) in response, the automated bidding agent by executing instructions on a processor-based system communicating requests for quotations to different automated entity agents for different groups of items on the list, each said automated entity agent corresponding to a different entity and each group comprising at least one of the items; and
    (c) the automated bidding agent by executing instructions on the processor-based system receiving the quotations from the automated entity agents, selecting a best quotation for each group, and communicating the best quotations to the representative for inclusion within the master price quotation.

2. A method according to claim 1, wherein the automated bidding agent is configured so as to preclude the representative from accessing quotations that competed with the best quotation.

3. A method according to claim 1, wherein at least one of the automated entity agents is configured to respond to requests for quotations from the automated bidding agent automatically, without human interaction, based on a local pricing model.

4. A method according to claim 1, wherein the automated bidding agent includes a user interface for a user to specify which entities will receive requests for quotations for a particular item or a particular group of items.

5. A method according to claim 1, further comprising a step of automatically tracking responsiveness to the requests for quotations of different entities.

6. A method according to claim 1, further comprising receiving bids from different entities across a plurality of different projects and automatically maintaining and analyzing statistics regarding amounts set forth in the bids by the different entities.

7. A method according to claim 1, wherein the representative also designates at least one customer requirement pertaining to the at least one item as being potentially subject to change, and wherein the automated bidding agent includes said designation in the requests for quotations.

8. A method according to claim 1, further comprising receiving bids by different entities, wherein the automated bidding agent includes an interface for the representative to specify adjustments of the bids.

9. A method according to claim 1, wherein the automated bidding agent conducts an auction in which the automated entity agents have the ability to view each other's quotations and, in response, to submit revised quotations.

10. A method according to claim 1, wherein the list submitted by the representative includes requirements specified in a structured manner, in accordance with a previously published format.

11. A method according to claim 10, wherein the list also includes unstructured requirements.

12. A method according to claim 11, wherein all of the requirements are communicated to each automated entity agent that is requested to submit a quotation.

13. A method according to claim 1, wherein the automated bidding agent automatically incorporates said best quotations into the master price quotation.

14. A method for generating a master price quotation, comprising:
    (a) a deal architect (i) creating a list that includes a plurality of items to be included within a master price quotation and (ii) submitting the list to an automated bidding agent;
    (b) in response, the automated bidding agent by executing instructions on a processor-based system dividing the list into groups of items, each group comprising at least one item, and communicating requests for quotations to different automated entity agents for different groups; and
    (c) the automated bidding agent by executing instructions on the processor-based system receiving the quotations from the automated entity agents, selecting a best quotation for each different group, and communicating the best quotations to the deal architect for inclusion within the master price quotation.

15. A method according to claim 14, wherein at least one of the automated entity agents is configured to respond to requests for quotation from the automated bidding agent automatically, without human interaction, based on a local pricing model, in specified circumstances.

16. A method according to claim 15, wherein the automated bidding agent automatically incorporates said best quotations into the master price quotation.

17. A method according to claim 15, wherein the at least one of the automated entity agents generates its quotation based on a pricing model that was specially modified for a particular project to which the master price quotation applies.

18. A computer-readable medium storing computer-executable process steps for generating a master price quotation, said process steps comprising:

(a) obtaining a list that includes a plurality of items to be included within a master price quotation;

(b) in response, dividing the list into different groups of items, each group comprising at least one item, and then, for the different groups, communicating requests for quotations to different entities; and (c) receiving the quotations from the different entities, selecting a best quotation, and incorporating the best quotation into at least an initial draft of the master price quotation.

19. A computer-readable medium according to claim 18, wherein the requests for quotations with respect to at least one of the different groups include requirements specified in a structured manner, in accordance with a previously published format, and also include unstructured requirements.

* * * * *